(12) United States Patent
Thiel

(10) Patent No.: US 6,472,616 B2
(45) Date of Patent: Oct. 29, 2002

(54) METHOD AND ARRANGEMENT FOR CONTROLLING A DYNAMIC SCALE

(75) Inventor: Wolfgang Thiel, Berlin (DE)

(73) Assignee: Francotyp-Postalia AG & Co., Birkenwerder (DE)

(*) Notice: Subject to any disclaimer, the term of this patent is extended or adjusted under 35 U.S.C. 154(b) by 0 days.

(21) Appl. No.: 10/007,898

(22) Filed: Nov. 5, 2001

(65) Prior Publication Data
US 2002/0060097 A1 May 23, 2002

Related U.S. Application Data

(63) Continuation of application No. 09/457,857, filed on Dec. 10, 1999, now Pat. No. 6,353,192.

(30) Foreign Application Priority Data

Dec. 18, 1998 (DE) .......................... 198 60 295

(51) Int. Cl.⁷ ................. G01G 19/40; G01G 19/413; G07B 17/02
(52) U.S. Cl. .................. 177/25.13; 177/25.15; 705/407; 705/415
(58) Field of Search .............. 177/25.11, 25.12, 177/25.13, 25.14, 25.15; 705/407, 415

(56) References Cited

U.S. PATENT DOCUMENTS

| | | | |
|---|---|---|---|
| 3,890,492 A | 6/1975 | Manduley et al. | 705/407 |
| 4,745,346 A | 5/1988 | Muller | 318/561 |
| 4,753,432 A | 6/1988 | Freeman | 271/35 |
| 4,778,018 A | 10/1988 | Cordery et al. | 177/210 FP |
| 4,787,048 A * | 11/1988 | Freeman et al. | 177/25.15 |
| 4,956,782 A * | 9/1990 | Freeman et al. | 177/25.15 |
| 5,014,797 A | 5/1991 | Dolan et al. | 177/4 |
| 5,174,400 A * | 12/1992 | Hasegawa et al. | 177/25.13 |
| 5,178,228 A * | 1/1993 | Feinland et al. | 177/25.13 |
| 5,226,496 A * | 7/1993 | Feinland et al. | 177/25.15 |
| 5,300,736 A | 4/1994 | Ehrhardt | 177/145 |
| 5,949,444 A | 9/1999 | Geserich et al. | 347/4 |
| 5,990,422 A | 11/1999 | Komori et al. | 177/25.11 |

* cited by examiner

Primary Examiner—Randy W. Gibson
(74) Attorney, Agent, or Firm—Schiff Hardin & Waite

(57) ABSTRACT

In a method an arrangement for controlling a dynamic scale is set via an input unit according to the respective requirements for processing a mixed mail stack, the setting optionally ensuing on the basis of selected shipping parameters and/or operating parameters that are displayed via a display unit. A modification of the operating parameters and data corresponding to the setting can be undertaken and stored in the non-volatile memory of the scale. Weighing of a supplied piece of mail takes place and a controller drives a conveyor of the scale such that the piece of mail is transported to a further processing station dependent on the operating parameters and data that have been set.

1 Claim, 6 Drawing Sheets

METHOD AND ARRANGEMENT FOR CONTROLLING A DYNAMIC SCALE

BACKGROUND OF THE INVENTION

This application is a continuation of Ser. No. 09/457,857, now U.S. Pat. No. 6,353,192 filed Dec. 10, 1999.

Field of the Invention

The present invention is directed to a method for controlling a dynamic scale and to a corresponding arrangement therefor, for use in a dynamic scale which weighs a piece of mail during a conveying event, particularly for a fast processing of mixed mail in a scale and franking system. The inventive method is suitable for users of mail-processing systems with a dynamic scale and postage-calculating postage meter machine as well as with dynamic postage calculating scales and franking devices.

Description of the Prior Art

"Mixed mail" means an unsorted stack of pieces of mail. The term "letters" is used below as a representative term for all other possible pieces of mail as well.

Dynamic letter scales are known. For example, Francotyp-Postalia AG & Co. distributes a dynamic letter scale as component of an automatic mail system Francopost 12.000. The letters are introduced as a stack and are first automatically separated. The separated letters are accepted by the dynamic weighing unit and their weight is identified. The weight determination must ensue with a precision that enables the allocation of the letters to the correct postage class. The postage is automatically transmitted to the connected franking unit, is billed and printed onto the letter. Upon placement of the letter onto the weighing pan and the transport thereof, mechanical vibrations are transmitted to the weighing cell, the amplitude thereof being approximately proportional to the absolute letter weight. These noise vibrations limit the precision of the measuring result. In general, a measuring precision of 1 g is specified in dynamic letter scales up to a letter weight of 1000 g. Letters that are heavier cannot be precisely weighed with this device, in manner which would enable an automatic postage setting of the franking unit. Such letters then must be separately weighed with a suitable, static scale. The corresponding postage must then be manually entered into the franking unit. The automatic execution is thus interrupted. Especially disadvantageous is the fact that the mail shipper cannot predict whether a specific letter that is introduced in common with the others as a stack will or will not exceed this weight limit.

U.S. Pat. No. 4,778,018 discloses a dynamic letter scale wherein the weighing pan is resiliently suspended relative to the conveying mechanism. The transmission of vibrations from the conveying mechanism to the weighing cell are intended to be attenuated by this arrangement. This damping, however, is adequate given high weights in order to assure an adequate measuring precision. Moreover, a resilient suspension produces an intrinsic oscillation of the weighing pan that lengthens the measuring time and thus reduces the letter throughput.

U.S. Pat. No. 5,014,797 discloses a non-modular apparatus for automatic mail processing wherein the dynamic weighing function is integrated in the franking unit. A shortening of the conveying paths and a letter throughput per time unit that is higher overall are thus achieved. Again, however, the maximum weight is limited given a prescribed measuring precision and processing speed. A product constructed according to this solution achieves a throughput of approximately 5,000 letters per hour given a maximum weight of 500 g. For pieces of mail having a higher weight, the manufacturer offers an additional static scale, thus an automatic processing of pieces of mail that one higher in weight is not possible.

U.S. Pat. No. 4,956,782 and British Specification 22 35 656 disclose semi-dynamic weighing. A user station arranged upstream in the processing chain can be a scale and a user station arranged downstream is a postage meter machine. A continuously moving piece of mail must be completely accepted by the scale for the measuring time required for weight identification. Given mixed mail, the probability is higher that the scale could determine an incorrect measured result. The measuring time is lengthened dependent on the dimensions of the letter. A complicated control that interprets the dimensions of the letter in advance and controllable motors are required for this purpose. Alternatively, the weighing path could be lengthened and a reject compartment could be provided, however, this would increase the length of the overall mail-processing system, which is not possible without more extensive retrofitting.

According to European Application 514 107, a control means interrupts transport given pieces of mail that are large and difficult to weigh until the measurement is stable. A detector is arranged in the scale close to the end of the conveyor belt at a downstream location, this detector only allowing a letter to pass whose weight has been identified before this point in time. Measuring errors occur given a short weighing path and unequally distributed mass in the letter or given a high conveying speed of high-mass letters. Given a stop, moreover, the letter can slide off the weighing pan due to its inertia. The dimensions of the weighing pan are therefore designed somewhat larger, or the conveying speed is fixed lower. The throughput given mixed mail is correspondingly reduced.

German Published Application 37 31 494 (U.S. Pat. No. 4,753,432) discloses that a resting time be provided in the weighing procedure, during which operation of the franking system and the transport system is interrupted because continued operation would otherwise produce too large a vibration. The transport time from the weighing module to the postage meter machine is selected short, however, the speed cannot be arbitrarily increased without increasing the risk of a jam of letters. The item output that can be achieved is limited by the pauses inserted into the executive sequence. The speed of weighing is limited by the speed of the weight identification, which causes a greater outlay given heavy pieces of mail when the measurement must be exact.

SUMMARY OF THE INVENTION

With the goal of increasing the throughput of pieces of mail per hour, an object of the invention is to achieve an automatic processing of pieces of mail even having higher weight, without a need for manual interventions during the mail processing. Alternative weighing means should be eliminated. An optimally high proportion of the outgoing mail of the mail shipper should be weighed in the dynamic mode.

The above object is achieved is achieved in accordance with the principles of the present invention in a method and an apparatus for controlling a dynamic scale which processes mixed mail, consisting of items having different weights, for use with a further processing station connected downstream from the dynamic scale, wherein the dynamic scale is set according to particular requirements for processing a mixed mail stack, this setting taking place through an input unit and ensuing on the basis of selected shipping parameters and/or operating parameters, and wherein operating parameters and data for the scale are modified according to the setting with the modified parameters and data being stored in a non-volatile memory, and wherein a supplied postal item from the stack of mixed mail is conveyed through the dynamic by a conveyor arrangement and is weighed therein and is transported from the dynamic scale to the further processing station dependent on the operating parameters and data which have been set.

The scale is basically composed of conveyor arrangement, weighing pan, a weighing cell as well as an electronic control and evaluation unit. The weighing pan preferably has a rectangular shape, with its dimension oriented transversely relative to the conveying direction minimally corresponding to the maximum letter format plus a tolerance allowing for admission of the letter to the weighing pan. The dimensioning of the weighing platform in the conveying direction must correspond to the maximum longitudinal format of the postal matter plus a distance that is traversed by the item being weighed during the weighing procedure. It is of no significance for the realization of the invention whether the pieces of mail are transported vertically or horizontally. A known weighing method can be employed in the weighing cell.

The inventive scale can, for example, be operated in three operating modes that are respectively adapted to the differing composition of the stack of letters to be processed:

1. The stack contains letter that all have the same weight, for example an advertising mailing with identical content. A weighing of the individual letters is thus omitted. In the first operating mode, the control unit outputs a control instruction for the maximum conveying speed to the drive of the conveying mechanism of the scale.

2. The stack contains mainly letters having the same weight, for example an advertising mailing with mainly identical enclosures, but also, a few letters to addressees which contain more extensive enclosures. In this case, it is beneficial to merely monitor a weight threshold, which is not exceeded by the great majority of letters having a known weight (upper threshold). The converse case of monitoring a lower threshold, which is exceeded by the great majority of letters is likewise possible. These thresholds can be set by the user via the input and output unit. Merely making a selection of the type of shipping suffices for frequently occurring shipping types having fixed threshold, for example infomail, as a result of which an appropriate, stored threshold is automatically activated (for example, infomail standard equals 20 g). Letters that lie beyond the threshold can, for example, be separated out of the letter stream. In general, the measuring precision and/or the conveying speed can be adapted to the height of the respective threshold by threshold monitoring. A low, upper threshold (for example 100 g) allows a relatively high conveying speed because weights below this threshold require only a very short time on the weighing platform, and higher weights need not be exactly measured since the fact that they are higher than the threshold already suffices.

3. The stack contains letters differing in weight (mixed mail). Each letter must be identified in terms of its weight with adequate precision and the postage must be calculated on the basis of this measured value. For example, an adequate precision and optimum conveying speed can be achieved when an upper measuring limit is set below which the individual letter weights lie.

The term "adequate precision" expresses the relationship between absolute measuring precision (no tolerance), upper limit of the measuring range and measuring time. The measuring time is limited by the path that the letter traverses on the weighing pan given a predetermined conveying speed. It can only be increased by lengthening the weighing pan or by reducing the conveying speed. Given a predetermined (fixed dimension) scale, only the latter of the two possibilities comes into consideration. A high measuring precision is obtainable only at the expense of the other two parameters of upper limits of the measuring range and the conveying speed, and therefore should be selected only as high as necessary in the interest of the customer. Typically a customer does not want to undergo a complicated "postage due" payment procedure due to a weight that was identified too low, but wants to avoid an excessively high postage not being paid due to a weight that was measured too high. The balancing of these demands is dependent on the structure of the postage rates. If, for example, the postage rates of a mail shipping company change in respective steps of 20 g, then relatively high measuring precision is required over the entire range of measurement. When the customer ships mainly "normal" letters most likely having low weight under these conditions, then a setting of the dynamic scale is possible that combines a high measuring precision of, for example, 0.5 g given average processing speed with a low, upper measuring range limit of, for example, 400 g for the dynamic mode. In another instance, the postage structure may be only slightly differentiated (stepped) in view of the weight. For example, there is the same upper weight limit of 1000 g at the Deutsche Post AG (DPAG) for shipping "infomail-large" and "infomail-maxi" below which the postage is independent of the weight. In this case, an optimum setting of the dynamic scale would ensue such that it would only monitor this limit value (see operating mode 2). Since an absolute precision of 10 g is adequate here, a relatively high conveying speed can still be enabled during weighing.

Dependent on the requirements for processing a particular stack of mixed mail, the inventive method allows an optimum setting of the dynamic scale, the setting optionally ensuing on the basis of selected shipping parameters and/or operating parameters. The setting of the dynamic scale ensues with three weighing parameters (measuring range, precision, speed) that are dependent on one another in terms of their magnitude, so that the modification of one parameter leads to the modification of at least one of the other parameters. Any modification of the control of the scale is monitored and is displayed via a display unit.

DESCRIPTION OF THE PREFERRED EMBODIMENTS

Figure 1:
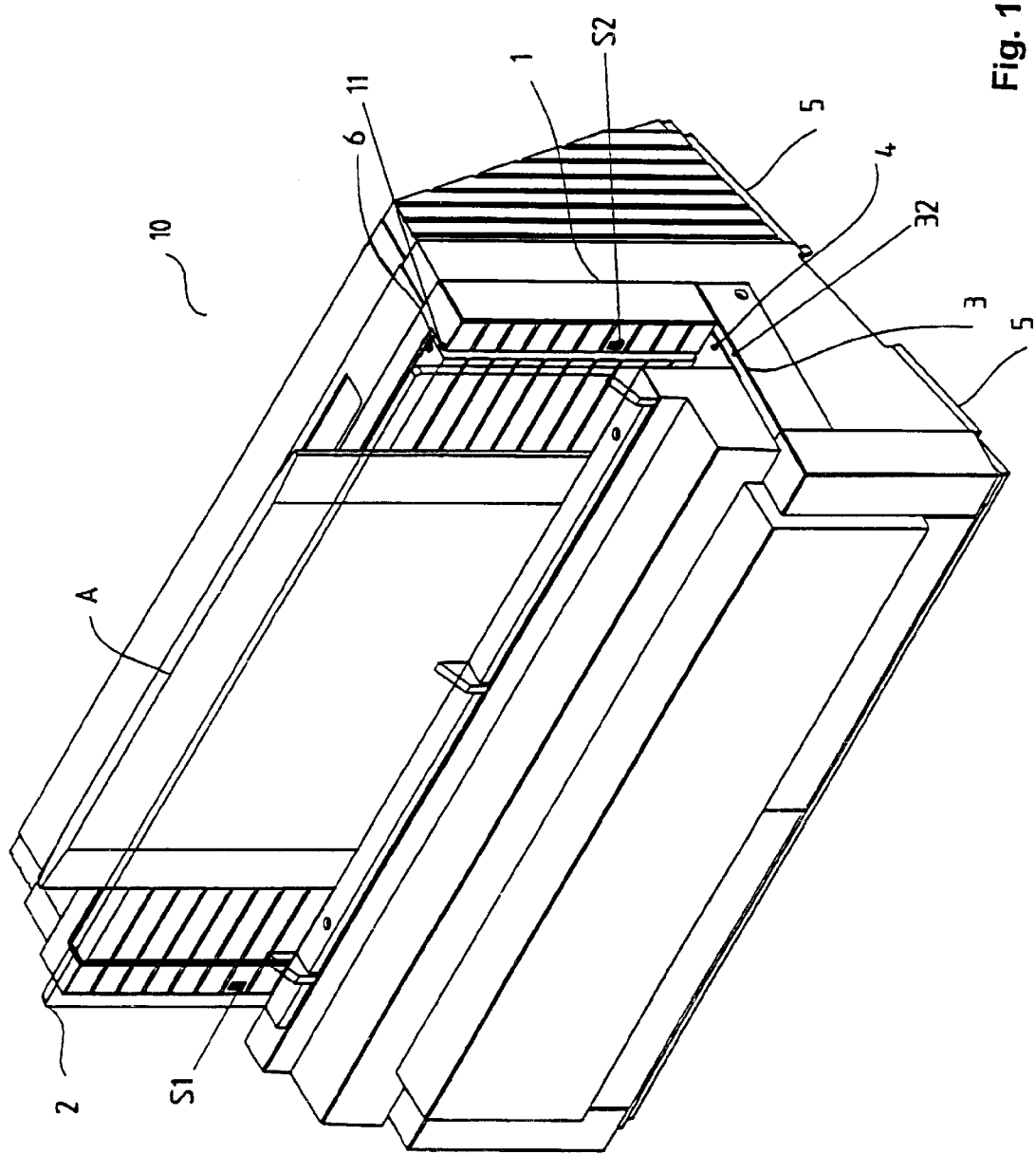
FIG. 1 is a perspective view of a dynamic scale constructed and operating in accordance with the invention seen from the right front constructed and operating in accordance with the invention.

FIG. 1 shows a perspective view of a dynamic scale 10 that is fashioned for the transport of letters or other pieces of mail A standing on edge. The letters A lie against a weighing pan 6 that is arranged in a back guide wall 1 of the scale 10 in a recess 11. Sensors 31 and S1 and S2 are arranged in the back guide wall 1 at both sides of the recess 11 for the weighing pan 6. These sensors S1 and S2 preferably are light barriers which respectively detect the trailing and leading edges of a letter A when it is transported onto the weighing pan 6. The sensor S1 is arranged upstream close to the beginning of the path of a letter A on the weighing pan 6 (as viewed in the conveying direction).

A conveyor arrangement 4 with a conveyor belt lies at the height of the lower guide wall 3 of the scale 10. The back guide wall 1 is slightly inclined toward the rear of the scale 10, preferably by 18° beyond the perpendicular. This corresponds to an optimization angle already determined for an automatic letter feed and a postage meter machine see (German PS 196 05 014 and German PS 196 05 015). The lower guide wall 3 is orthogonal relative to the back and, consequently also orthogonal relative to the front cover plate 2. A defined letter attitude and a smooth adaptation to the preceding and following devices thus are achieved. The front cover plate 2 is composed, for example, of plexiglass. All assemblies or parts are secured on a chassis 5 via corresponding intermediate members. Further details regarding the structural format of the scale can be derived from German Patent application P 198 33 767.1-53.

Figure 2:
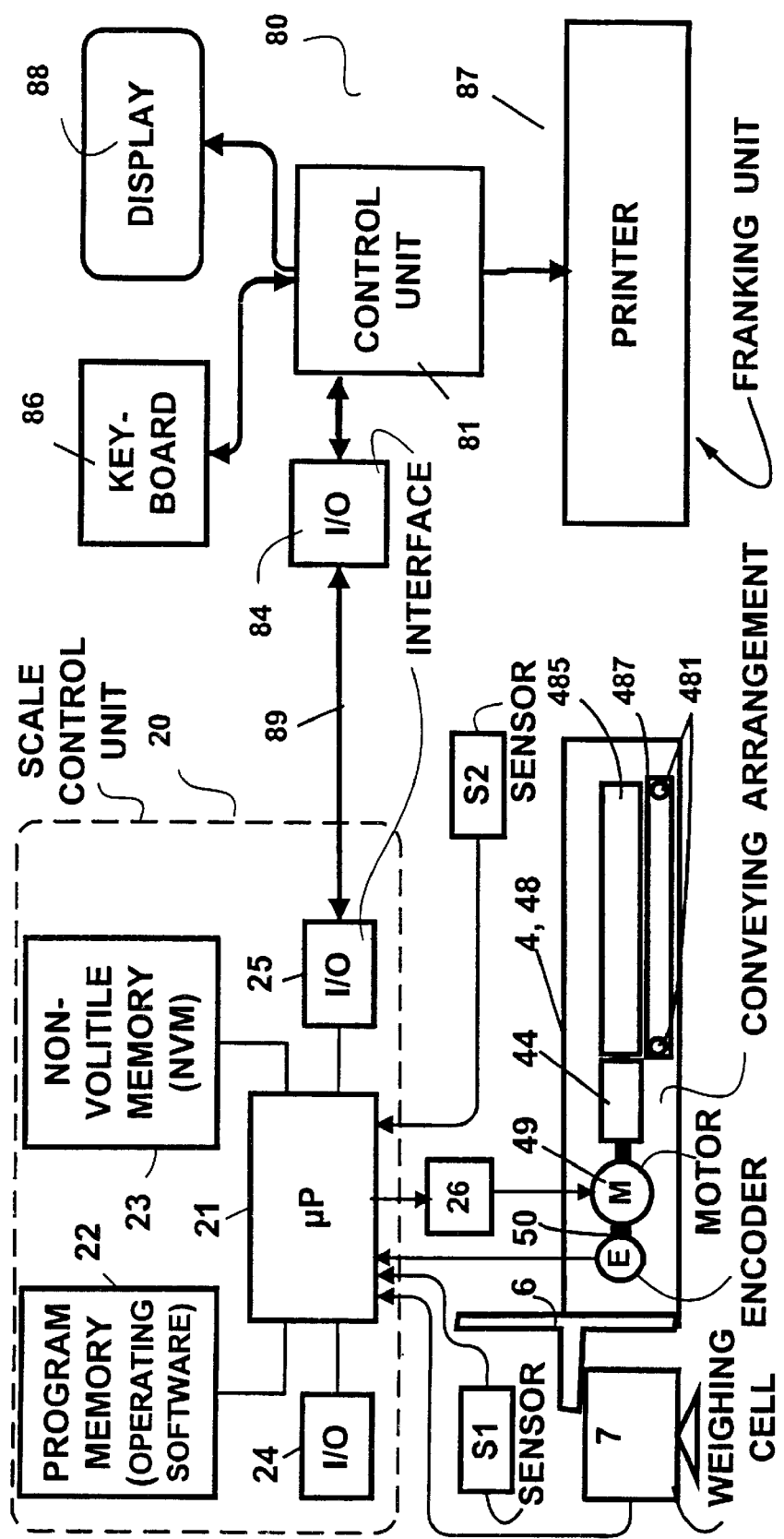
FIG. 2 block circuit diagram of the controller of a dynamic scale constructed and operating in accordance with the invention and the controller of a franking unit.

The block circuit diagram of the controller of the dynamic scale 10 and the block circuit diagram of the controller of a franking unit are explained with reference to FIG. 2. The controller 20 of the dynamic scale 10 includes a microprocessor 21 that is connected to a program memory 22, a non-volatile memory 23 as well as to an input interface 24 and an output interface 25. The microprocessor 21 is operationally connected to a motor 49 of the conveyor arrangement 4 via a driver 26, to an encoder 50, and to the sensors S1, S2 as well as to a weighing cell 7 in order to receive sensor signals, encoder signals and weight data so as to formulate and send control instructions to the conveyor arrangement 4. The motor 49 is preferably a DC motor that is supplied with DC pulses, its specific speed being set on the basis of the ratio of the pulse length to the pulse pause. In the operating mode for the dynamic operation of the scale 10, the conveyor arrangement 4 implements a forward (downstream) motion of the appertaining letter A within the scale 10 at a specific speed; this speed does not exceed the conveying speed in the further processing station.

In a further embodiment the motor 49 of the conveyor arrangement 4 is a motor which updates at a speed set by a control instruction and the control unit 20 generates corresponding control instructions with which the conveying speed in the scale 10 can be modified in the second operating mode.

In another embodiment the conveyor arrangement has a switchable drive and the controller 20 includes the driver 26, the conveying direction of the scale being able to be reversed therewith in order to transport the letter back to the middle of the weighing pan 6 in a further operating mode in order to implement a re-weighing. The driver 26 can be fashioned as a relay. The control signals proceeding from the control unit 20 drive the relay that connects the voltage for driving the motor 49. The motor 49 is connected via a suitable transmission 44 to a drive roller 485. The transmission 44 can be a gear wheel transmission of a belt transmission.

In an alternative embodiment, the conveyor arrangement 4 includes switchable transmission connected to the motor 49, the conveying direction being reversed in the second operating mode by switching the transmission given operating voltage applied to the motor 49. By a corresponding control, it can be switched into neutral or into some other transmission ratio.

A permanently driven transport mechanism is a further alternative, with a control signal being used in order to suppress the engagement of other conveyor means, for example a roller pair, with the letter surface, such as by lifting the roller pair off from the letter surface by a further drive motor.

in an especially effective realization of the invention the transport speed can be set in several steps by the control unit. Drives with stepping motors are particularly suited for this purpose. The control unit is preferably implemented as a microprocessor-controlled, programmable module 20 with the aforemention interfaces 24 and 25.

Of course, known scales for horizontally conveyed letters or having a conveyor means fashioned in some other way can be utilized in modified form for corresponding franking means.

The weighing cell 7 has, for example, a wire strain gauge with a connected evaluation circuit that emits digital weight data to the microprocessor 21. The specific weighing method employed in the weighing cell 7 is of no significance. For example, the method in German OS 30 23 565 can be used. The upstream sensor S1 upstream serves as entry sensor and the downstream sensor S2 serves as a discharge sensor. A known evaluation circuit that emits digital signals to the microprocessor 21 is connected each to sensor S1 and S2. The weighing cell 7 is preferably of the type HBM PW 2G of Hottinger Baldwin Messtechnik. Given this type, an evaluation circuit is already integrated into the weighing cell 7. The evaluation circuit is in communication with the electrical output of the weighing cell 7 and undertakes calibration and smoothing of each measured value.

The non-volatile memory 23 is, for example, an $E^2$PROM with machine-specific parameters and data for controlling the scale 10 that were acquired from empirical values of the manufacture and that are stored in table form. The control unit 20 processes input signals from the sensors S1 and S2 and the data from the non-volatile memory 23 and generates output signals for the drive motor 49 of the conveyor arrangement 4 dependent on the letter position and monitors the weight, or implements a weight determination.

The program memory 22 of the scale 10 contains a program for evaluating the measured values, the microprocessor $\mu P$ of the controller 20 being programmed to communicate only a plausible measured value to the franking unit 80. After editing the measured value, a weight class is identified according to a postage table from which a postage value is calculated, taking further postal information such as shipping type, shipping destination, etc., into consideration. These last steps can be implemented in the control unit 81 of the franking unit (postage meter machine) 80 to which the measured weight value is then transmitted. To this end, the controller 20 of the dynamic scale is connected to the controller 81 of the franking unit 80 via the interface 25, which for this purpose can be a serial interface, via a cable 89 and via another serial interface 84. The user interface of the franking unit 80 is preferably utilized for the entry and display of the further postal information, and additional parameters, into the scale 10. The user has a keyboard 86 available that allows the inventive modification of operating parameters and data that are preferably stored in the non-volatile memory 23 of the scale. The display 88 of the franking unit 80 preferably also is utilized for displaying the scale parameter setting. The franking imprint is implemented with a printing station 87 that preferably includes a digitally operating printing head, for example an ink jet printing head. This allows the newly calculated franking value to be printed without delay even in the case of mixed mail.

Figure 3:
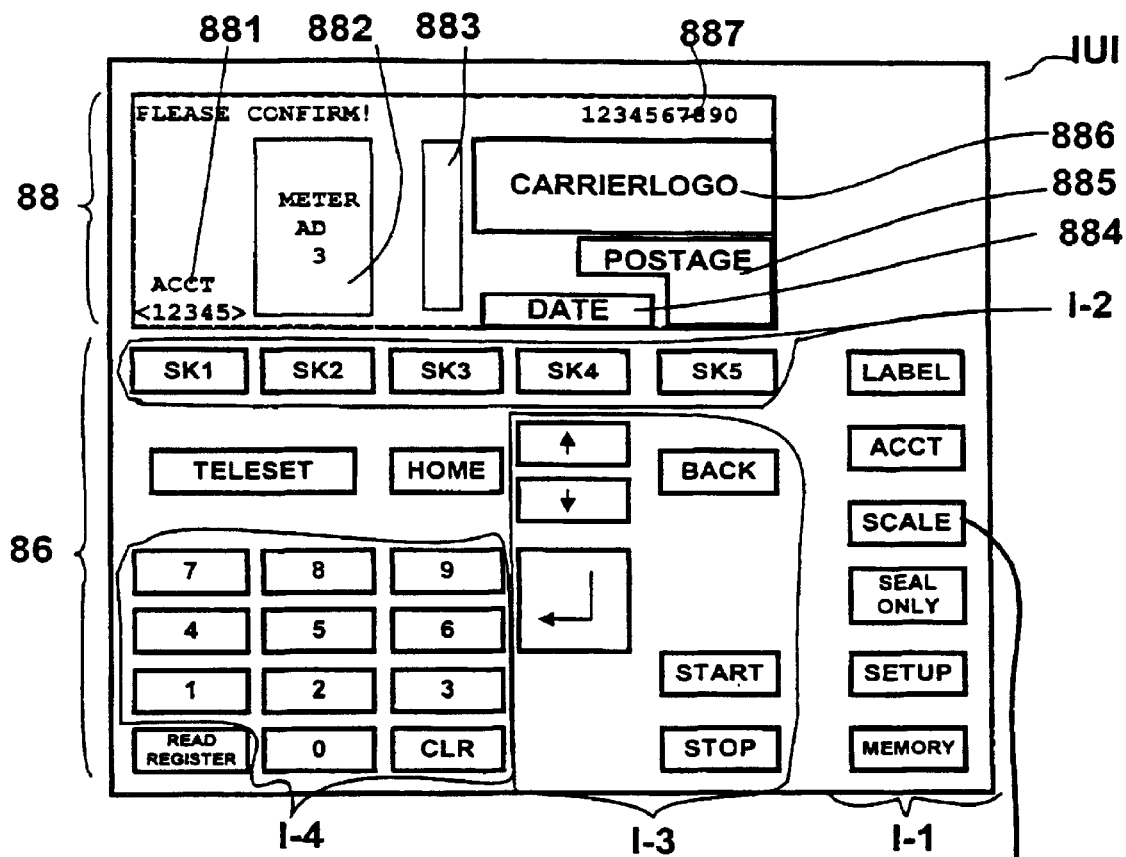
FIG. 3 shows a user interface of a franking means.

FIG. 3 shows an example of an internationally employable user interface IUI for a postage meter machine 80 with the display unit 88 and with the input unit 86. The display unit 88 is a large-area display below which the input unit 86, with a number of input fields I-1, I-2, I-3 and I-4, is arranged. A controller 81 (not shown in greater detail) includes a microprocessor and a program memory with a program for generating screen images. After being turned on, the microprocessor generates a first screen image that shows a basic menu for franking. A number of display fields (lying above one another) can be presented in each screen image, the boundaries thereof being variable. A first (upper) display field 887 is provided for warnings, operating instructions and input prompts, and can contain at least one status line with display of the input in an editing field. For example, this can offer the possibility of entering values of up to 10 characters. A second (middle) display field is provided for input options and setting parameter instructions. A third (lower) display field serves as a function designation field for a number of soft keys arranged therebelow. Given the illustrated screen image, individual sub-images 881 through 885 of the second and third display field are combined with one another with respect to their functions. Displayed are: the cost center accounting number in display field 881, the advertising slogan number in display field 882, the selective printing types in display field 883, the date in display field 884 and the postage value in display field 885. The sub-image 886 is provided for the carrier logo, or the format of the postage stamp that is characteristic of each mail carrier. The menu structures are not strictly coupled to templates. Slide images as well as list images can be displayed in addition to the three-field subdivision.

The input unit has four input element fields that, in conjunction with the illustrated screen images, enable an uncomplicated input by the user. The actuation elements of the input fields are preferably keys. Basic menus can be directly selected via basic menu keys (hard keys) of a first input field I-1. The microprocessor generates a specific screen image for each basic menu, this being displayed by the display unit 88. Entry into the basic menu for franking and the display of the basic menu image are triggered with a home key. With these basic menu keys, the user can accomplish the change to a different menu path from arbitrary positions of the menu tree. These further entry points are valid, for example, for the cost center administration (ACCT), for the meter functions (SETUP), for setting the shipping parameters for the purpose of postage calculation (SCALE), for remote value prescription (TELESET) and further functions. The hard keys are labeled such that the operating function can be immediately understood by the user. Proceeding from the basic menu image for franking, which approximately represents a franking image to be printed, on the other hand, inputs can be actuated in a known way with soft keys of a second input field I-2 in order to modify the franking format or in order to modify at least one of the parameters of postage value, date, selective imprints, advertising slogan or cost center number displayed therewith.

The function of the soft keys is dependent on the functioning on which the menu or list images are based. Moreover, menus or list images displayable in generated screen images continue to be alternatively selectable via operating elements of a third input field I-3, for which the operating elements are hard keys. By actuating a back key 9, a screen image that was previously already set is retrieved. Additionally, screen images are selected via two further hard keys ↑ and ↓ (page keys) of the third input field I-3, the selection of the screen images proceeding by page-by-page paging. In a known manner, inputs are actuated for editing functions via hard keys of the fourth input field I-4.

Figure 4:
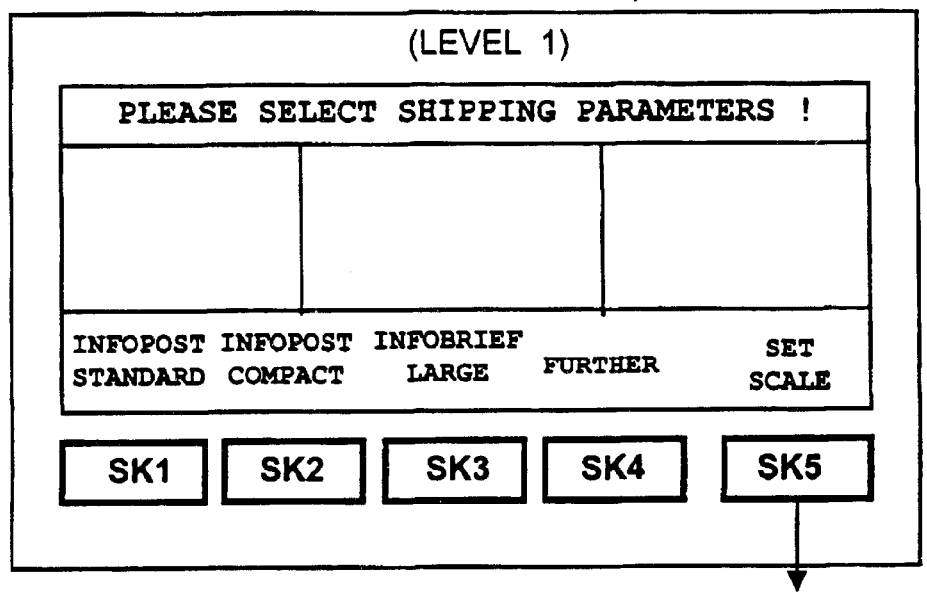
FIG. 4 shows a screen image for setting the shipping parameters in accordance with the invention.

The basic menu image 300 is directly selected via the basic menu key SCALE of the first input field I-1, this being explained in greater detail with reference to FIG. 4. FIG. 4 shows a screen image for setting the shipping parameters. These are required for postage calculation in addition to the identified weight value. A request: PLEASE SELECT SHIPPING PARAMETERS! ensues in the third display field. No shipping parameter is initially displayed and is not displayed in the second display field until the input has been actuated. One of the soft keys is pressed for this input. FURTHER screen images having a number of shipping parameters can be called with the soft key SK4. For example, INFOMAIL STANDARD is set with the soft key SK1. The shipping parameter, i.e. INFOMAIL STANDARD, entered first is displayed in the left part of the second display field. Now, for example, the display in the third display field changes since only specific combinations of shipping parameters are allowed. Functions of the soft keys that are allowed after selection of the first shipping parameter are displayed in the third display field. Upon actuation of the soft key SK5, the function SET SCALE is called and the screen image 350 is displayed.

Figure 5:
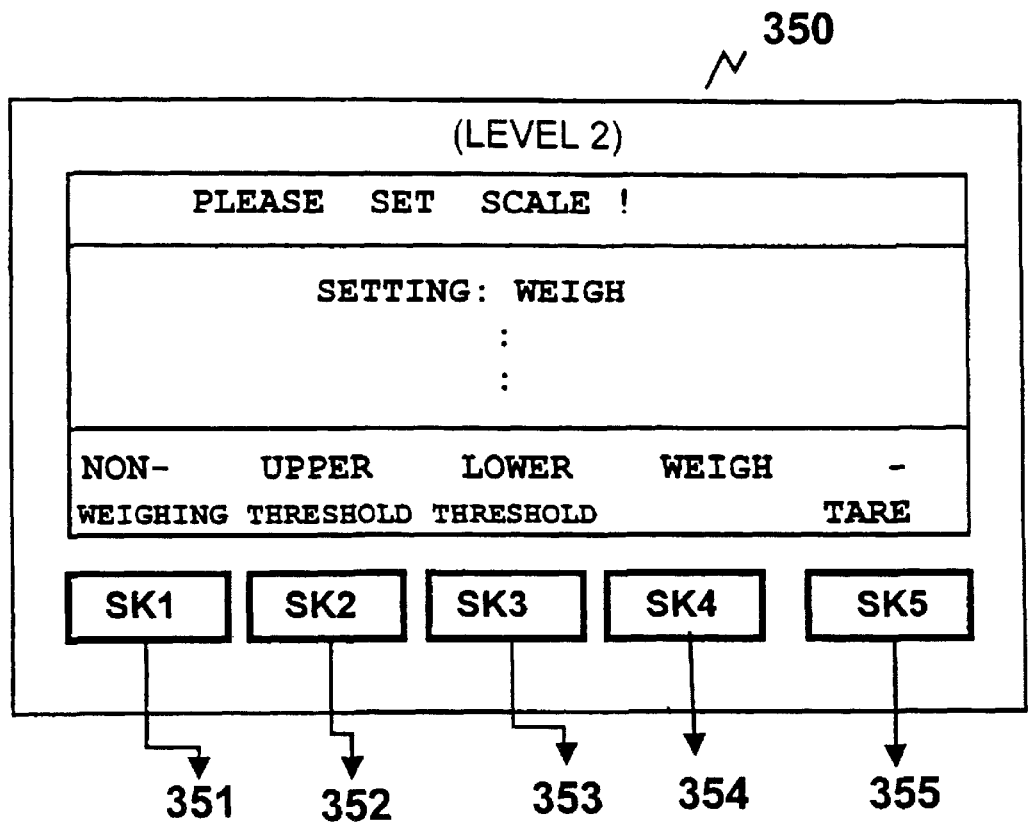
FIG. 5 shows a screen image for setting the scale in accordance with the invention.
Figure 6:
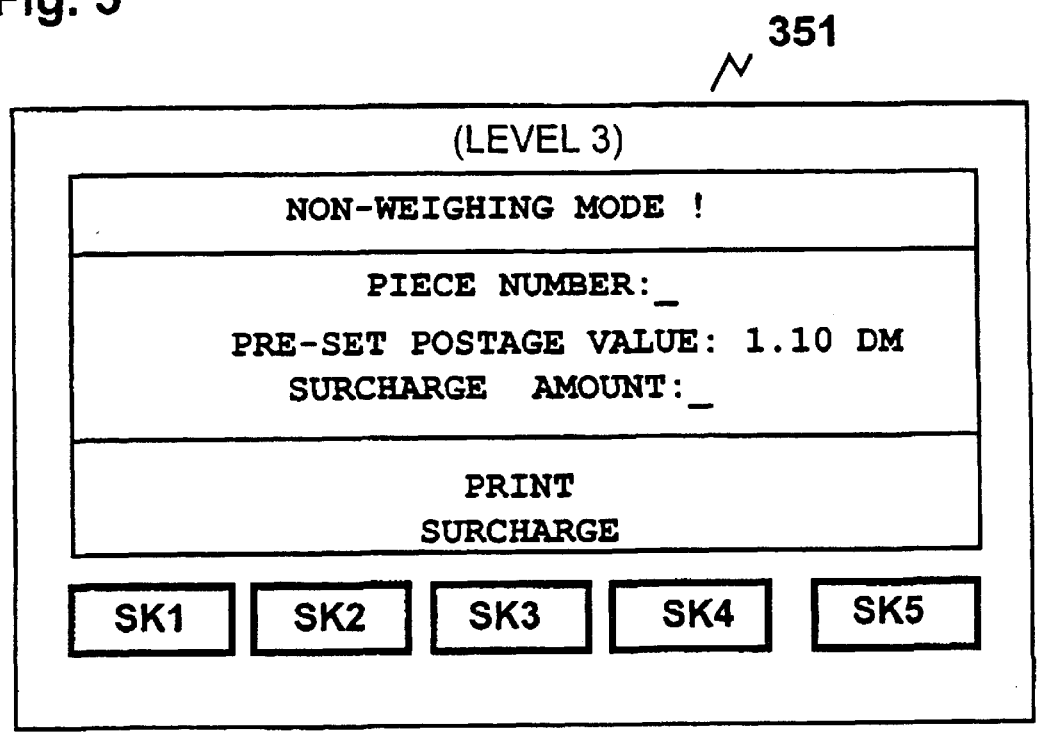
FIG. 6 shows a screen image for the non-weigh mode in accordance with the invention.

FIG. 5 shows such a screen image 350 for setting the scale. If the soft key SK4 of the second input field I-2 was actuated to make inputs, the mode WEIGH—which is shown—is set. Upon actuation of the soft key SK1, a NON-WEIGHING MODE is set. FIG. 6 shows a corresponding screen image 351 for the non-weighing mode. The controller 81 communicates the setting of this mode to the microprocessor 21 of the controller 20 of the dynamic scale 10 via the cable 89 and the interfaces 84 and 25. The conveying speed can be set to its maximum value. In addition, the item output of the mail-processing system can be increased by reducing the spacing between the individually supplied pieces of mail. It can be boosted to approximately 100% of the item output of a connected postage meter machine that prints the postage value that has been set and prints the selective imprint. A separating means (not shown) can be arranged upstream of the scale 10, the control unit thereof being connected to the control unit 20 of the scale 10, so that the control unit of the separator can be switched for fast separation and delivery of the letter A to the dynamic scale 10, as a result whereof the item output of the mail-processing system including the scale 10 and the franking unit 80 is increased by reducing the spacing between the individually supplied pieces of mail.

If the display exhibits no value for a postage value that has been set, then the postage value must likewise first be set in the basic menu for franking.

After actuation of the HOME key, the basic menu for franking appears, which allows the possibility of entering a postage value directly by actuating the number keys. Subsequently, the BACK key is actuated in order to jump back into the preceding screen image 351 for the non-weighing mode that is shown in FIG. 6.

The screen image in the non-weighing mode offers the possibility of printing the corresponding selective imprint for a specific number of pieces of mail. First, this number is entered via the number keys and is confirmed with the enter key. The shipping parameter was already previously selected, for example, INFOMAIL. Minimum mailing quantities apply for mailing INFOMAIL/infoletter. An additional payment is required if this minimum mailing amount is not met. The postage meter machine calculates the required additional payment amount from the difference from the minimum mailing quantity and displays this amount. Upon actuation of the third soft key SK3, the additional payment amount is printed as a franking value on a separate franking tape.

Figure 7:
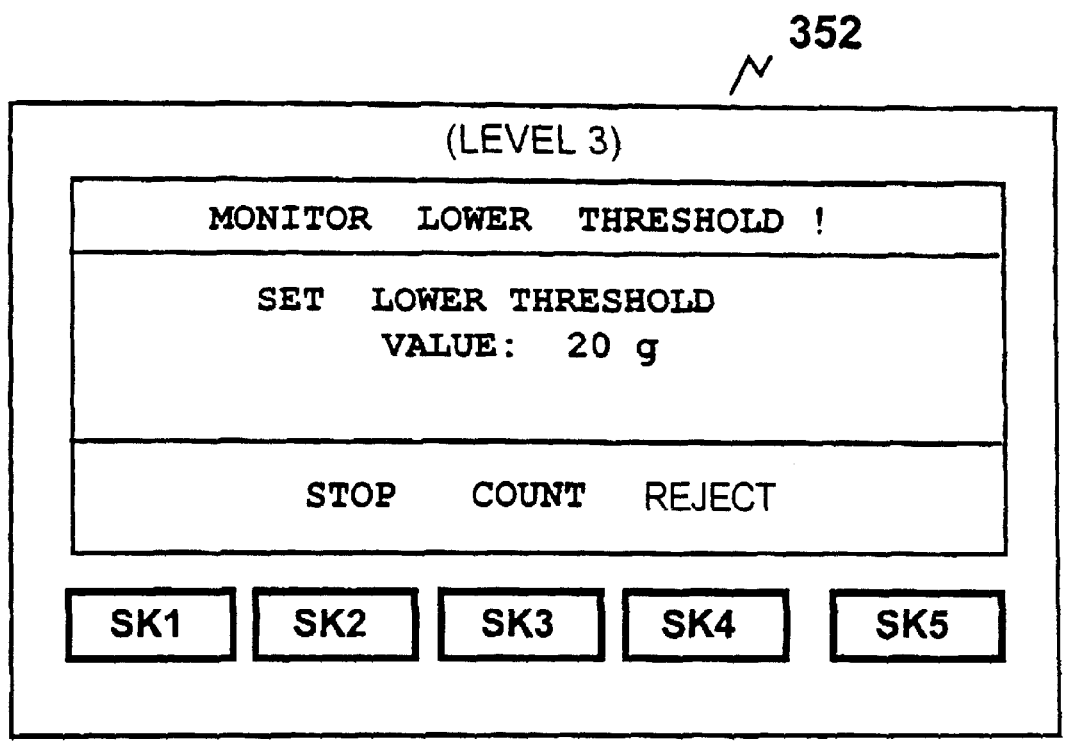
FIG. 7 shows a screen image for setting the scale to monitoring the lower threshold in accordance with the invention.

A switch into a second mode from the screen image for setting the scale shown in FIG. 5 can be made by actuating the soft key SK2. It may mistakenly occur in mail-processing systems that an empty envelope is franked. It may also occur in mail-processing systems that an envelope mistakenly does not contain a specific enclosure, so that the letter weight is reduced. A function for monitoring the lower letter weight is desirable in this respect. FIG. 7 shows a screen image 352 for setting the scale 10 to monitoring the lower threshold, which is automatically set to, for example, 20 g according to a fee table. The options for a setting of a further function (STOP, COUNT or REJECT) that is called via the soft key SK2 through SK4 are shown in the third display window of the screen image 352. Given the function STOP, the scale 10 stops further conveying of the letter A for the purpose of the removal thereof. Given the function COUNT, the scale 10 stores the count value before further conveying the letter A for the purpose of subsequently designationally removing it from the stack of mail. Given the function REJECT, a reject mechanism is driven which rejects the excessively light weight letter from the mail stream.

Figure 8:
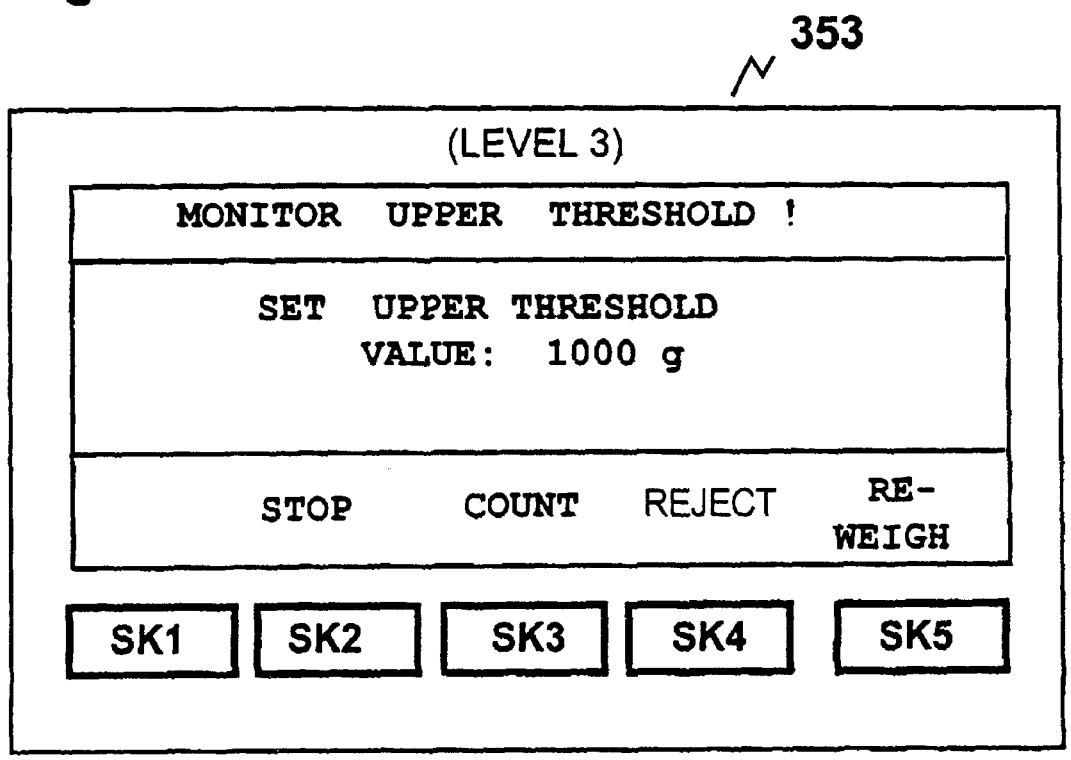
FIG. 8 shows a screen image for setting the scale to monitoring the upper threshold in accordance with the invention.

A switch into a third mode from the screen image for setting the scale 10 shown in FIG. 5 can be made by actuating the soft key SK3. FIG. 8 shows a corresponding screen image 353 for setting the scale to monitor the upper threshold. This monitoring again has the purpose of allowing rejection of a few letters in order to be able to undertake an elimination of the deficiency or in order to immediately initiate a re-weighing. The actuation of the soft key SK3 allows the function COUNT in conjunction with further conveying of the letter A at maximum speed. After processing the stack of mail, the number and positions (count values) for pieces of mail are emitted that exceed the upper threshold (for example, 1000 g). Such pieces of mail then can be removed from the stack later in order, if necessary, to initiate a weight reduction, for example by removing enclosures. Given appropriate design pre-conditions, the reactions STOP or EJECT are also possible (similar to that already described for monitoring the lower threshold).

Figures 9, 10:
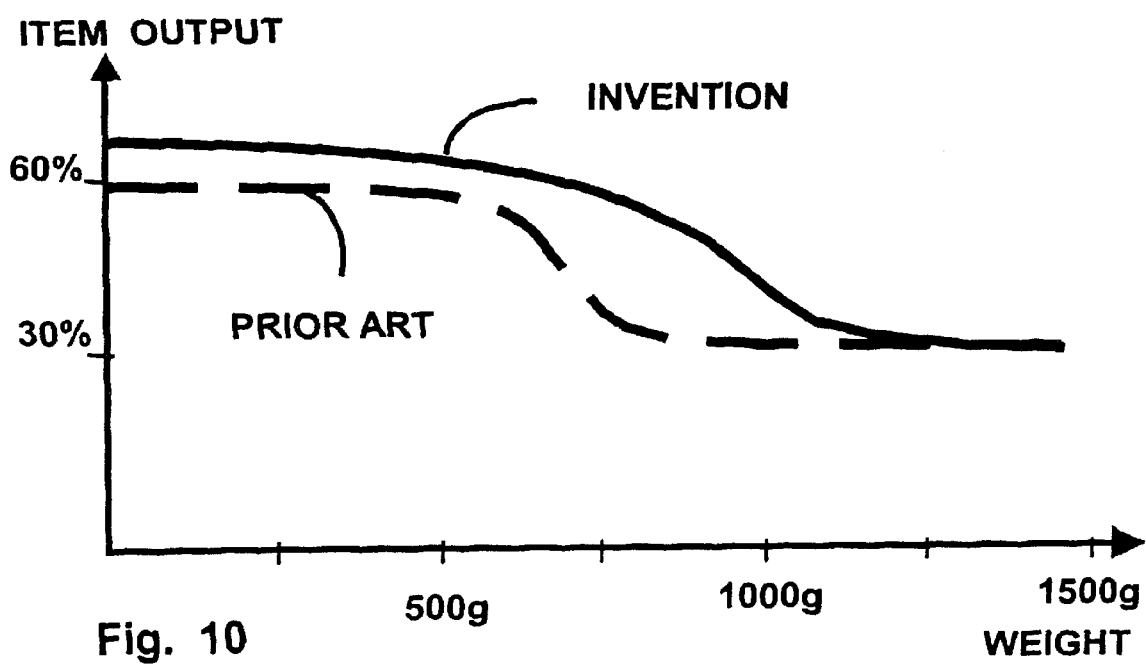
FIG. 9 shows a screen image for setting the weighing parameter in accordance with the invention.
FIG. 10 illustrates the item output of the scale given mixed mail processing in accordance with the invention.

A switch into a fourth mode from the screen image for setting the scale shown in FIG. 5 can be made by actuating the soft key SK4. FIG. 9 shows a screen image 354 for setting three weighing parameters: measuring range, measuring tolerance and speed. The speed of the transport of the postal matter in the scale can be set lower with the soft key SK5 and can be set maximally equal to the conveying speed of the franking unit 80 with the soft key SK4. For example, the conveying speed can be reduced for large and heavy items since the measuring time for large and heavy pieces of mail must be lengthened given the same measuring tolerance (precision). If a pre-set measuring tolerance is to be modified, the entry of the weighing parameter MEASURING TOLERANCE ensues by actuating the number keys and the soft key SK3. As a result, the limit value for the resulting range of measurement deriving is automatically displayed via the screen image. The range of measurement can be increased with the soft key SK1, or can be reduced with SK2, this also having a modifying effect on the conveying speed that has been set. The inventive method thus continues to create the possibility of also being able to weigh pieces of mail beyond the limit of a range of measurement.

In a first approximation, there is a linear relationship between measuring precision Y, upper measuring range limit $G_0$ and transport velocity V:

$$Y \sim \frac{1}{G_o} \cdot \frac{1}{V} \tag{1}$$

The following is also valid for a measuring tolerance:

$$\Delta \sim 1/Y \tag{2}$$

At least one of these parameters is set in order, with given geometrical preconditions, to modify at least one of the other parameters in a predetermined way and to achieve an adaptation to the operating situation of the respective mail shipper in such a way that a performance enhancement, and thus expansion of the range of utilization of the dynamic scale 10 is achieved overall. As a rule, two parameters are set, the third parameter being directly derived therefrom with equation (1) or equation (2).

The trained user, for example, enters the range of measurement with the soft keys SK1 and SK2 on the basis of empirical values after the user has estimated the stack of mail. For example, it may be estimated that no letters in the stack contain a weight of more than 500 g. The shipping type INFOMAIL LARGE was previously entered with the screen image 300 via the user interface, and thus a measuring range of 1000 g and an appertaining tolerance value $\Delta=\pm 1$ g had been set. With the two values Go=500 g and $\Delta=\pm 1$ g, the microprocessor of the controller can identify the third parameter, namely the transport speed V, via a two-dimensional matrix and can display this parameter. When, as in the present example, the matrix yields a value V=30 cm/s which deviates from zero, then dynamic weighing is permitted. If the displayed weighing parameters are confirmed by actuating the enter key, the system is set on the basis of these parameters. The inventive matrix as well as the modification of operating parameters are stored in the non-volatile memory 23. An example of such a matrix is:

| Δ | Go | | | | | |
|---|---|---|---|---|---|---|
| | 20 g | 50 g | 100 g | 200 g | 500 g | 1000 g |
| ±5 g | 200 cm/s | 200 cm/s | 200 cm/s | 120 cm/s | 70 cm/s | 45 cm/s |
| ±2.5 g | 200 cm/s | 200 cm/s | 120 cm/s | 70 cm/s | 50 cm/s | 35 cm/s |
| ±1 g | 200 cm/s | 100 cm/s | 60 cm/s | 40 cm/s | 30 cm/s | 20 cm/s |
| ±0.5 g | 120 cm/2s | 60 cm/s | 40 cm/s | 30 cm/s | 20 cm/s | 0 |
| ±0.25 g | 70 cm/s | 40 cm/s | 30 cm/s | 20 cm/s | 0 | 0 |

The combination of tolerance and weight limit value is no longer meaningful given the value zero. In such instances, only static weighing can be carried out. As a result of the drive, 200 cm/s is available as the maximum conveying speed. A combination of, for example, the values Go=20 g and Δ=±5 g thus can no longer lead to an increase in the real transport speed. In order to acquire a usable relationship between these three setting parameters in practice, of course, structurally specific adaptation factors and constants are required.

These determinations are preferably implemented empirically by the manufacturer. A discrete graduation of the parameters is adequate and enables a fast determination on the basis of corresponding matrices (for V and for Go and Δ as well). If only two parameters can be set, for example the transport speed cannot be set, the relationship can be presented in lists (for Go and Δ) that are in turn stored in the non-volatile memory 23 of the dynamic scale.

FIG. 10 shows an illustration of the item output of the scale 10 given mixed mail processing as diagram. Only the "non-weighing mode" (not shown) leads to an item output of approximately 100% of the item output of a postage meter machine when the spacings between two pieces of mail are minimized. Otherwise, a maximum of 66% of the item output can be achieved. A slow and semi-dynamic weighing thus ensues given heavy pieces of mail (right side of the illustration). According to the diagram, only approximately one-third of the item output of a postage meter machine is therefore achieved. The advantages of the invention are dynamic operation in the lower (up to 500 g) and medium (500 through 1000 g) weight ranges as a result of an item output of the system that is higher by 7 through 27% compared to a system of the prior art. The higher item output is achieved because it is usually unnecessary, given suitable setting of the parameters, to interrupt the automatic sequence of the mail processing. The method sequence for weighing a letter from the stack shall be explained below with reference to an exemplary embodiment.

When a letter A reaches the region of the dynamic scale, the leading edge of the letter is detected via the sensor S1 and this signal is forwarded to the control unit. The control unit reacts according to the operating mode that has been set.

No weighing event is triggered when the "non-weighing mode" is set. The speed for the transport mechanism is set to maximum. There is no upper limit of the measuring range. Only the mechanical structure of the weighing pan 6 sets an upper limit that, however, normally lies a multiple above the maximum, upper measuring range limit.

If a mode with threshold monitoring is set, a weighing event is triggered. After expiration of the measuring time, a weight value is present that is now compared to the preset, stored threshold. For of simplicity, an upper threshold is assumed. The following comments apply analogously to the other mode with a lower threshold. The following cases can occur.

1. The threshold is downwardly transgressed: the letter A is further-conveyed and is franked with the preset postage in the connected franking unit 80.
2. The threshold is exceeded: a corresponding control signal is generated that, dependent on the system configuration, enables removal of the letter A from the stack. If a known reject unit is inserted between the dynamic scale 10 and the franking unit 80, then this receives an instruction from the control unit of the dynamic scale 10 to reject the appertaining letter. The letter A is then separated from the normal letter stream by a mechanically actuated flipper or drop flap and can be separately handled. If such a reject unit is not a system component, then the control unit generates an instruction to the drive unit of the transport mechanism that stops the letter transport. Information is also forwarded to the display indicating that the set limit for the postage was exceeded. The corresponding letter A can then be manually removed and the processing can be restarted.

If the WEIGHING mode is set, a weight value is present after the expiration of the measuring time. The latter should lie below the measuring range limit that has been set. This is made possible by the controller of the scale 10 in the second operating mode reducing the transport speed to a predetermined value. The following cases are fundamentally possible:

3. The selected, upper measuring range limit Go is downwardly transgressed, meaning that the measured value lies within the valid range of measurement and therefore was capable of being identified with adequate precision. The control unit communicates the measured value to the franking unit 80, where the franking value is determined on the basis of further postal parameters using a postage table. The corresponding letter A is franked with this individually identified franking value.
4. The selected, upper measuring range limit Go is exceeded, meaning that the measured value lies outside the valid range of measurement and was therefore not capable of being identified with adequate precision. This leads to stoppage of the letter transport and removal of the letter A or the reject thereof. In another version, it is possible to maintain the automatic execution for such letters. To that end, the control unit communicates an instruction to the drive unit of the transport mechanism to stop the letter transport. After the expiration of a decay time, another weighing event is triggered, this time in a static condition of the dynamic scale 10. After the expiration of the measuring time, the control unit communicates the start instruction for continued transport of the letter A to the drive unit. The statically identified measured value is transmitted to the franking unit 80 and the corresponding franking value is determined thereat.

The procedure described for the last condition assures that the processing of the mail stack is executed fully automatically even given upward transgression of the range of measurement. Of course, the described execution requires a longer processing time in the case of the weight exceeding the range of measurement than given a shipment that can still be dynamically measured by the scale 10. The main causes are the braking and acceleration phase of the transport mechanism. Added thereto is a time duration for the decay (subsidence) of the movement of the weighing pan 6, whose magnitude is dependent on design parameters of the dynamic scale 10 and can be most reliably determined empirically by the manufacturer. The actual measuring time, by contrast, does not differ from that in the dynamic mode. The described sequence is still always multiply faster than the alternative of manual use of an external, static scale for the corresponding letter.

It is of particular significance for shipping items that exceed the range of measurement due to their high weight that the center of gravity in the conveying direction is located approximately in the middle of the weighing pan 6 at the point in time of measurement. It can thus be assured that no significant torque acts on the weighing pan 6 which would then be transmitted to the weighing cell 7 and may falsify the weight measurement. For the great majority of postal shipping items, the weight is distributed approximately uniformly over the length of the item; the middle of the postal item thus represents the center of gravity. With the arrangement shown in FIG. 2, a positioning of the postal item that is optimum for the measuring precision can be achieved as follows. The letter length is determined by the control unit 20 with the assistance of sensors. The sensor S1 at the letter entry of the scale is used for this purpose. Given a constant conveying speed, the letter length is derived as the time between the signal "letter here" and "letter gone". The two binary signals are distinguished by the change from zero to one or one to zero. Alternatively, the control unit 20 can also have the letter length communicated to it from a preceding letter separating means. From the known position of the leading edge of the letter and its length, the conveying path is now determined that must still be traversed by the letter up to the optimum position of the letter. Given a constant conveying speed, this remaining path corresponds to a specific conveying time. After the expiration of this time, the control unit 20 recognizes that the measured signals supplied by the measuring cell 7 are valid and further-processes these signals. When a letter is to be semidynamically weighed, a stop signal is emitted to the motor 49 of the conveyor arrangement 4. An even more precise positioning is achieved if the conveyor arrangement reduces its speed to zero in steps. Additionally, further sensors arranged in the transport path can provide an answer back about the current position of the leading letter edge. This previous can be based on a specific setting of the parameters of measuring precision, upper limit of measuring range and conveying speed. This setting defines the performance capability (measuring precision, conveying speed) and the range of employment (upper measuring range limit) of the dynamic scale. It is possible to modify the latter when one or two of the parameters are designationally modified. The conditions for this shall be explained below.

When the requirements of the mail dispatcher are clearly outlined and presumably change little, then a setting of these parameters is already possible at the time of manufacture, distribution or installation of the dynamic scale 10. Without intervening into the design parameters of the scale 10 such as, for example, the selection of a specific scale sensor, it is possible to achieve an optimum adaptation of the scale by entering data. In this case, this adaptation can be such that the 1 000 g limit is monitored with a relatively rough precision of 10 g. It can be accepted that excessively high postage will be paid in probably 1% of the cases. As a result, however, it is possible to obtain a maximum conveying speed, and thus an especially high throughput of pieces of mail. This conveying speed can be up to at least twice as high than given an unmodified, maximum measuring precision of 1 g. The required setting of the data can be undertaken by various input means. It can advantageously ensue by entering data into a data memory, or by replacing such a memory with one having correspondingly suitable data. In a specific version, the setting of the dynamic scale 10 takes place when installing the dynamic scale 10 is at a customer a service technician. To this end, the technician connects a service computer to the serial interface 25. This service computer contains a similar user prompting as was presented with reference to the user interface according to FIGS. 5 through 9.

In general, however, the requirements of the mail dispatcher are not constant and must cover a broad range of uses. In this case, the input of the setting data is undertaken by the mail dispatcher himself. An example of such a situation, the mail dispatcher may have recently implemented a mailing to a large group of customers. All letters had the same content and were therefore economically sent as INFOMAIL. Since extensive brochure material was to be enclosed, only shipping as "INFOMAIL maxi" could be used. The selected setting of the dynamic scale 10 (monitoring the 1000 g limit) thus corresponded to the above example. Next, a stack of mixed mail is pending. The contents extend from invoices (minimum weight) through diverse matter (medium weight not identifiable in greater detail) up to targeted offers with selected brochure material (maximum of 500 g). The boundary conditions for an optimum setting here, accordingly, are the permitted measuring precision and the upper measuring range limit equals 500 g. According to the relationship determined for this scale type, there is a specific conveying speed that just makes it possible to achieve the two target quantities of permitted measuring precision and upper measuring range limit =500 g. Supported by a user dialog, the mail dispatcher preferably enters both values at the franking unit 80. The two setting values are transmitted to the control unit 20 of the dynamic scale 10. The relationship between the operating parameters that is valid for this scale type have been stored thereat by the manufacturer. The third setting parameter is determined on this basis. Given, for example, $\Delta=\pm 1$ g, the maximum conveying speed is 30 cm/s. This identified setting parameter is displayed for confirmation by the mail dispatcher. After acknowledgment this parameter is stored and is then transmitted to the corresponding actuator via the appropriate port of the control unit 20. In this example, a correspondingly edited reference value would be transmitted to the drive (for example, stepping motor) for the letter transport. The storage of the data ensues in memory areas B1 through B3 that are provided according to the three aforementioned matrices for V, Go and $\Delta$ in the non-volatile memory 23. Data are thereby transmitted from the franking unit 80 to the dynamic scale 10. The communication between an automatic feed, dynamic scale 10 and the franking unit 80 can sequence, for example, in a way similar to that disclosed in German OS 197 11 997.

Micro-controllers or application-specific integrated circuits (ASICs) also can be utilized instead of a microprocessor.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for controlling a dynamic scale of individually weighing postal items in a mixed mail stack, comprising the steps of:

controlling transport of a postal item from a mail stack in a dynamic scale to and from a weighting location on a conveyor by a controller;

entering a weight range having an upper limit into said controller;

upon weighing said postal item, determining in said controller whether said upper limit has been exceeded;

if said upper limit is exceeded, stopping said conveyor via said controller and thereby stopping transport of further postal items from said mail stack;

allowing a decay time associated with mechanical vibrations at said weighing location to expire;

after said decay time, conducting a static weighing, during a weighing time, at said weighing location of the postal item which exceeded said upper limit;

after said weighing time, re-starting said conveyor via said controller; and emitting an output signal from said scale identifying the weight of said postal item which exceeded said upper limit obtained during said static weighing.

* * * * *